Sept. 20, 1966 P. A. SONGER 3,274,316
METHOD OF MAKING REINFORCED CORRUGATED HOSE
Filed July 20, 1964 3 Sheets-Sheet 1
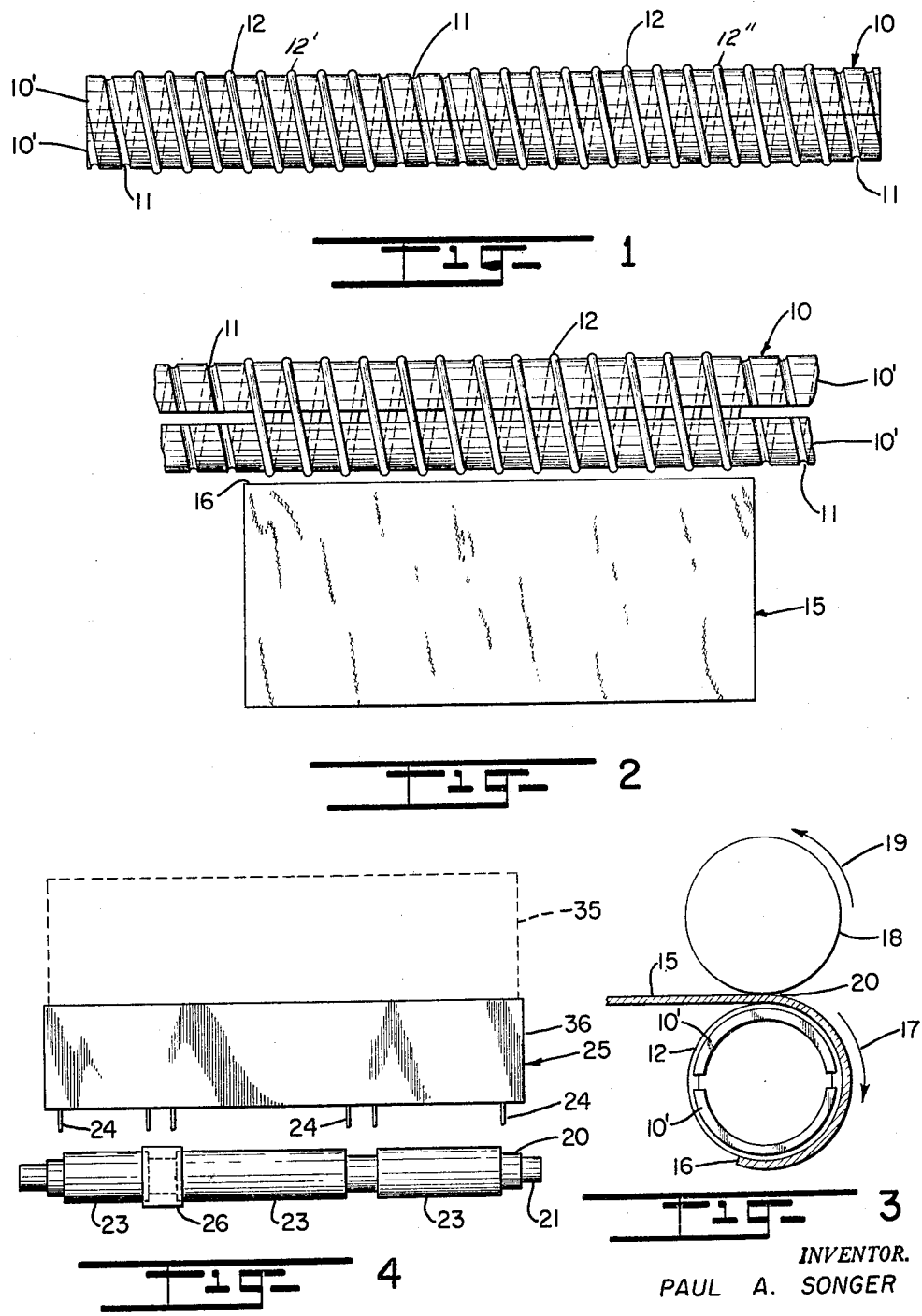
INVENTOR.
PAUL A. SONGER Sept. 20, 1966  P. A. SONGER  3,274,316
METHOD OF MAKING REINFORCED CORRUGATED HOSE
Filed July 20, 1964  3 Sheets-Sheet 2
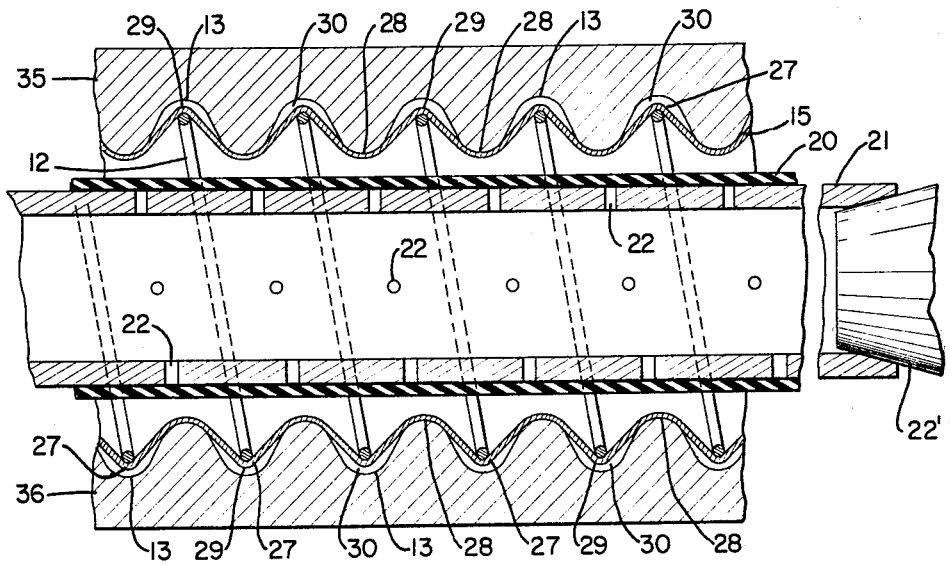
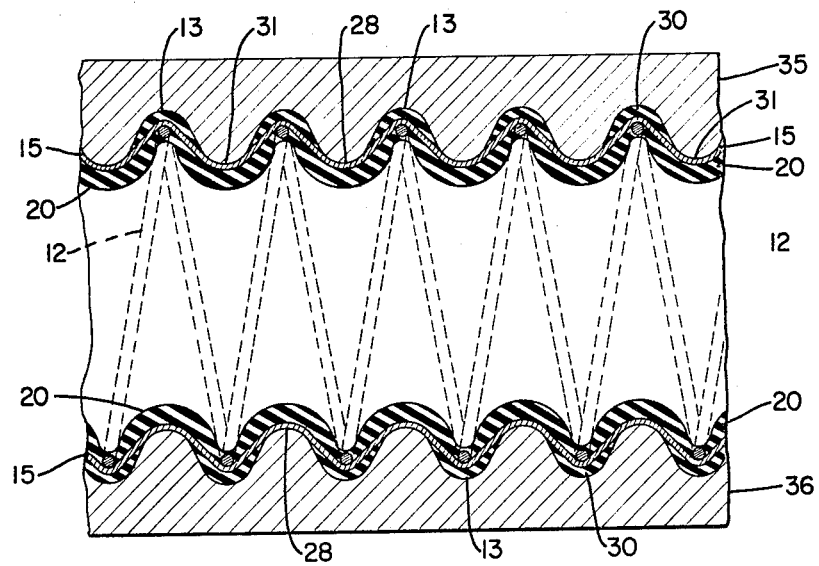
INVENTOR.
PAUL A. SONGER

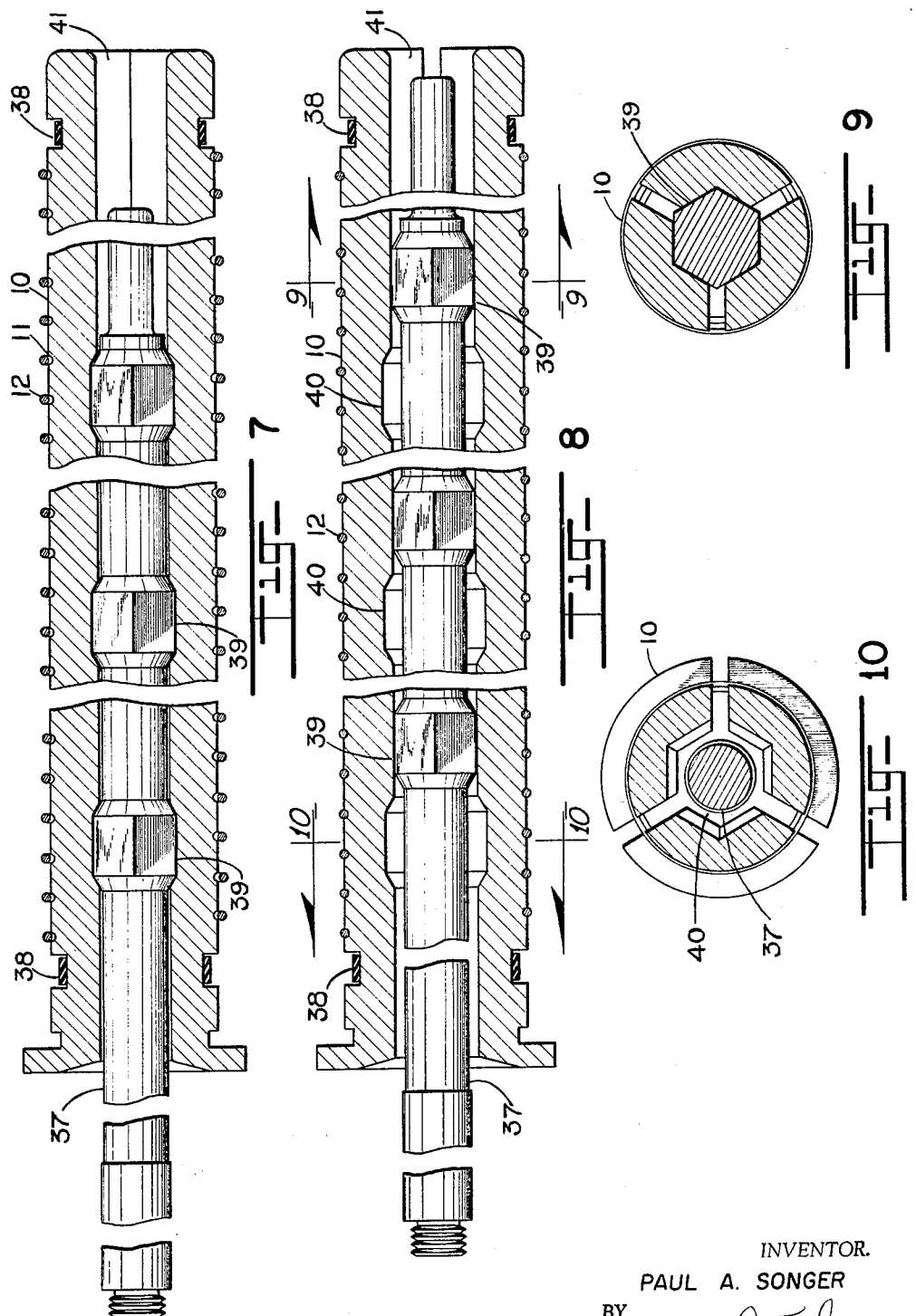

United States Patent Office 3,274,316
Patented Sept. 20, 1966

3,274,316
METHOD OF MAKING REINFORCED
CORRUGATED HOSE
Paul A. Songer, Denver, Colo., assignor to The Gates
Rubber Company, Denver, Colo., a corporation of
Colorado
Filed July 20, 1964, Ser. No. 383,816
7 Claims. (Cl. 264—94)

This invention relates to a method of making flexible, corrugated hose. More particularly, this invention relates to a novel and improved method for making a helically corrugated hose having a spiral reinforcing member embedded in the corrugations of the tube body.

This application is a continuation-in-part of my co-pending application, Serial No. 135,393, filed July 31, 1961, now abandoned.

Various methods have been heretofore proposed for the manufacture of hose which is designed principally to accommodate use on automobile radiator systems. Because of the great variety of path lengths between the radiator connecting portion and the engine block, hose capable of traversing irregular paths has become necessary. In addition, with the advent of pressure cooling systems, hose which is able to withstand resistance to collapse is also necessary. Under these conditions a hose construction incorporating a reinforcing coil member will provide the necessary collapse resistance, and in accordance with the present invention, it is proposed to adopt a unique forming and manufacturing process whereby optimum flexibility and wear characteristics are attained.

An important feature, therefore, of the present invention resides in the preliminary step of forming the helical reinforcing member whereby positive dimensional characteristics are obtained. It has been found that accurate control must be maintained over the diameter of the spring-like reinforcing member and, more especially, accurate control must be maintained on the pitch relation of the turns. In order to accomplish this objective a coil spring of a length which has been predetermined is manufactured by conventional spring forming means. As is known by those versed in the art of spring forming methods of manufacture, a spring member may be formed which has generally the characteristics of diameter and pitch relation which is desired. However, accurate control of the pitch is not available by these well-known means. Thus, as can readily be seen if the pitch is not carefully controlled, any error which occurs becomes progressively worse until the magnitude of error is greatly exaggerated along the complete length of the spring member.

In order to obtain accurate alignment of the successive turns of the reinforcing member within the corrugated mold it is obvious that the helical member must possess an accurate and closely controlled pitch relation. The turns, therefore, can then become properly aligned within the corrugations of the mold which serves to form the hose structure.

In addition to controlling the pitch relation, it is also essential to positively control the diameter of the reinforcing member. In order to accomplish accurate dimensional relation of the various components of the hose structure, it is essential that the reinforcing member initially has proper dimensional characteristics. In the present invention the reinforcing member is actually embedded in the corrugations of the hose body. It is felt that in order to gain maximum utilization of the reinforcing member the member should be substantially in the mid portion of the convolution and not at the bottom of the trough or secured to the top of the crest. This dimensional relation can only be accomplished by a very careful and positive control of the dimensional characteristics of the reinforcement.

Various complex methods have been devised for manufacturing a hose having helical reinforcement within a corrugated body portion and having circular end portions for attaching the hose to the connecting member. The present invention resides in a method for manufacturing hose of this type by means of which the diameter and pitch of the helical reinforcement can be very accurately and closely controlled. In addition, the method herein described very easily lends itself to the simultaneous manufacture of a number of separate hose members in a unified operation.

It is therefore one object of this invention to provide a method for efficiently and economically molding one or more flexible corrugated reinforced hose members in a single operation.

It is further a principal object of this invention to provide a method for accurately and positively controlling the pitch and diameter of a spiral reinforcing coil member which is to serve as a reinforcing member within the corrugated body.

Still another object of this invention is to provide a procedure for retaining a spiral reinforcing coil member in a predetermined and controlled dimensional relation.

An additional object of this invention is to provide a means for forming hose structures from secured spiral spring members, where the spring member is formed for positioning in unique relation within the hose thereby to attain increased flexibility and wear characteristics.

Yet another object of this invention is to provide a method of accurately forming and positioning a reinforcing member in precise relative relationship for incorporation into the structure of a corrugated hose body in a minimum number of steps and in a rapid and dependable manner.

The invention contemplates a method for accurately forming and incorporating a spiral reinforcing member into a hose structure in a fixed and predetermined relation with respect to the finished complete structure. The invention involves forming the spiral reinforcement into an accurate diametric and pitch configuration by means of a radially expandable form having guides on the surface and aligning the spiral reinforcement with the guide on the expanded form. While the spiral reinforcement is thus positively held in the predetermined diametric and pitch relation, an outer reinforcement is secured to the surface of the spiral reinforcing member thereby maintaining the spiral member in the predetermined relation when it is removed from the expanded form. The secured spiral reinforcement can then be positioned with other components, such as a tubular body member, which are used to form the finished hose structure. The positioned components are then vulcanized into a unitary structure to form the finished hose member.

Other objects and advantages of the present invention will be apparent from the specification and claims which follow when considered in connection with the drawings.

FIGURE 1 shows a plurality of reinforcement members on a form;

FIGURE 2 shows the form in an expanded position and carefully and positively controlling the pitch and diameter relation of a reinforcing member. In addition, a fabric wrap is seen in position to be subseqently wrapped upon the outer circumference of the dimensionally controlled member;

FIGURE 3 shows the fabric being applied to the outer circumference of the dimensionally maintained reinforcing member;

FIGURE 4 shows the method by which the various components of a hose structure are applied upon a mandrel subsequent to being formed by the molding operation;

FIGURE 5 indicates the dimensional relations of the various components of the hose structure with the corrugated mold before the components have been molded into a unitary structure;

FIGURE 6 indicates the dimensional relative positions of the various components in the finished molded hose structure;

FIGURE 7 shows the cross section of the form and the form expander in a closed position;

FIGURE 8 shows the form and the form expander in an expanded position;

FIGURE 9 is a cross section along 9—9; and

FIGURE 10 is a cross section along 10—10.

Referring now to the figures, an elongate cylindrical form 10 is provided on the surface of which are guides or indentations 11 to establish the desired pitch and diameter of a spiral reinforcement in the form of a coiled spring 12. Generally the spring 12 can be preformed essentially according to well-known methods for forming a coiled spring member, and whereby the approximate pitch and diameter dimensions are attained during the spring forming operation. This forming operation, however, does not produce the accurate dimensional characteristics which are necessary for the utilization of these members as the reinforcement within a corrugated hose. Thus, the form 10 is an essential feature of the present invention.

In more detail the form 10 is split into a number of cylinder segments 10' (generally two or three) capable of separation for expansion from a normally closed diameter, as shown in FIGURE 1, to an enlarged or expanded diameter, as illustrated in FIGURE 2. Diametric expansion may be suitably effected by means of an internal expander 37 which may be made to engage internal portions of the sectors of the cylindrical form. By means of such engagement the sectors are forced outward to the precise enlarged diameter. The enlarged diameter will be governed in accordance with the diameter of the reinforcement which is to be formed within the hose body.

As will be subsequently shown, the expanded diameter must be precisely determined and controlled. One of the foremost features of the invention is the very accurate dimensional determination of the reinforcement 12 within the hose body. In order to accomplish this degree of accuracy, the diameter and pitch of the reinforcement 12 must be very carefully determined and subsequently controlled not only during the fabrication stages, but throughout the entire process. Because of this importance of accurate dimensional control, the form 10 and the accurate control of the expansion thereof will be more fully described.

As was mentioned, the form 10 generally consists of two or more sectors 10' which in a closed position define a continuous cylinder. The form 10 is normally sprung in a closed position by means of garter springs 38. The expander is operated by an air cylinder (not shown) in such a manner that in the normally closed position the expander 37 is not in internal engagement with the sectors 10' of the form.

Reference to FIGURES 7 and 8 will indicate that the expander 37 generally consists of a circular rod with spaced apart hexagonal enlargements 39. Generally, because of the careful control of the dimensional expansion of the form 10, it has been found to be adavntageous to space the enlargements 39 such that one enlargement will be placed substantially at each end of the form 10 with a third enlargement to be placed substantially in the middle of the form 10. In this way, even stress distribution and even expansion forces can be applied and will in turn carefully control the dimensional control along the entire length of the form 10. Within the form 10 a corresponding axial opening extends throughout the length of the form 10 to accommodate the expander 37. An equal number of spaced apart housings 40 are presented within which the enlargements 39 may be situated. It is obvious that the housings 40 are axially spaced apart the same distance as are the enlargements 39 and have a diameter sufficient to accommodate the enlargements 39.

Expansion of the form 10 can therefore be accomplished by axial movement of the expander 37. By actuating the air cylinder, the expander 37 will be forced axially toward the open end 41 of the form 10. It will be noted that the housings 40 have tapered or sloped edges in order to facilitate the axial movement of the enlargements 39 into and out of the housings 40. The cross sectional shape of the hollow portion of the form 10 between the housing portions is generally hexagonal as is the cross sectional shape of the enlargements 39. Thus, it is clear that as the expansions are axially shifted out of the housings into the portion intermediate of the housings, the sectors 10' will be forced outward to accommodate the enlargements 39. In order to clearly show the relationship of the expander 37 and the enlargements 39, both as they are accommodated within the housings 40 and intermediate of the housings, sections have been taken along 9—9 and 10—10. By careful control of the dimensions of the enlargements 39 and of the hollow cross section intermediate housings 40, it can readily be seen that precise control of the external diameter of the form 10 can be accomplished.

It has been found that by providing a series of expanders 37 and/or forms 10 of different dimensions that a large variety of diametric characteristics can be obtained. As will subsequently be more fully explained, the reinforcement 12 can then be made to coincide with the form guides 11 in order to precisely maintain both the diameter and pitch of the reinforcement 12 as it proceeds through further fabrication stages.

The guides 11 are preferably defined by a continuous, spiral groove inscribed in the surface of the cylindrical form, and the groove will similarly have a diameter, when the form, is in expanded relation, corresponding to the desired inner diameter of the reinforcement 12 in the hose body. In addition, the spiral groove is given a pitch identical to that of the corrugations in the hose to be formed. In this way, by aligning the spring reinforcement 12 with the turns of the groove, followed by expansion of the form into engagement with the spring 12, the pitch and diameter of the spring 12 will be controlled to correspond to the exact pitch and diameter relationship necessary for the successive turns of the spring to fit within the crests of the hose body and corresponding to the troughs 13 of a corrugated mold section 25, shown in FIGURES 4–6.

The reinforcing member is thus temporarily held in its correct pitch and diameter relation by the expanded form 10, and to permanently and positively maintain this relation upon removal from the form a retention member most desirably defined by retaining member 15 is applied into firm contact with the spring reinforcement 12. The reinforcing member 15 is suitably composed of rubberized fabric and can be cut at any angle or on the square direction, whichever is most desirable for the particular application for which it is to be utilized. In application, the reinforcing member 15 is wrapped concentrically about the spring 12 preferably in the manner illustrated in FIGURES 2 and 3. Here, lateral edge 16 is secured to a section along the axial length of the spring member by applying pressure to the sticky or tacky rubberized fabric, and the expanded form 10 upon which the spring is secured is rotated in such a direction, as indicated by the arrow 17, that the fabric is then wrapped around the cylindrical surface described by the form and the spring. A contacting roll 18 which rotates in the opposite direction, as indicated by the arrow 19, engages the surface of the expanded form 10 at a point at which the fabric 15 is introduced onto the surface of the expanded spring. The roll 19 exerts pressure at the nip area 20 so that the reinforcing member 15 is securely applied to the surface of the spring member. The reinforcing member 15 is wrapped at least one full turn around the cylinder defined by the expanded spring member to a degree such that the opposite lateral edge of the reinforcement 15 may be securely adhered to the leading lateral edge 16 of the fabric. After the wrap is thus secured, the reinforcing member 12 is tightly contained within the reinforcing member, so that upon contraction and release the expanded form 10 of the reinforcing member 12 is securely held to the correct diametric and pitch relationship by and within the outer reinforcement 15. It is obvious that if a stronger but less flexible hose structure is desired, the fabric reinforcement 15 may be wound upon itself any desired number of times according to the characteristics that are desired; however, once the spring has been wrapped by the rubberized fabric even only one full turn, it is found to be unusually stable as to its dimensional characteristics and may be subsequently handled in any normal manner for additional incorporation into the final hose structure. Even though the wrapped spring may undergo processing in additional manufacturing operations and may be handled during such operations, the wrapped reinforcement retains its dimensional stability, both as to pitch and diameter of the spring.

It will be appreciated that other ways may be adapted for retaining the reinforcement 12 in a fixed pitch relationship, the principal consideration being that the means selected is capable of holding the spring in desired relation and also is susceptible of being incorporated into the hose. Therefore, the pitch and diameter may be maintained by positioning around the spring and the expanded form a knit stockinet, calendered elastomeric sheeting, or even strips of material which may be secured to the outer surface of the cylinder formed by the coiled reinforcement.

Another feature of the present invention resides in the simultaneous prefabrication of a series of interconnected, wrapped reinforcements for subsequent formation into multiple interconnected hose sections. A much longer expandable form 10 is utilized in this type of operation, and is long enough to accommodate two or more separate reinforcing springs. Referring particularly to FIGURE 1, it is thus seen that there are two separate spring reinforcing members 12' and 12". Assuming then that the total length of the expandable form would be 6 ft. it is apparent that a number of separate springs 12 of varying lengths may be applied to the expandable form 10 and their over-all length would govern the total length of the expandable form. Each spring is separated from the next adjacent spring by a distance long enough to accommodate a cylindrical end portion for each adjacent hose structure. Of course, for ease of manufacturing procedure these separate reinforcing springs are carefully indexed upon the long expandable form. The form is then expanded with the springs in aligned relation and the springs are wrapped in much the same manner as was previously described for fabrication of a single hose. However, in this particular mode, it is possible to place one single long wrap around the separate reinforcing springs, in order that the separate, spaced-apart springs 12 are securely held in the correct dimensional character within the single length of reinforcing wrap 15, while also being held in properly spaced relation for forming into a series of hose sections.

A fabricating operation according to FIGURE 1 is employed in the formation of a corrugated hose utilizing the springs and outer concentric retention member as the reinforcement therein. In this final stage, the operation will be described with reference to the simultaneous formation of multiple hose sections utilizing a series of interconnected, wrapped spring reinforcements as just described; however, it will be readily appreciated from the following that the steps may be employed in forming a single hose length from a single wrapped spring length. By reference to FIGURES 4 and 5, a tube 20 of rubber or rubber-like elastomeric material is formed to serve as the body portion of the hose member, and which is loosely positioned over a hollow tubular mandrel 21. Regardless of whether a single hose section or multiple interconnected hose sections are to be formed, a single length of tube will suffice. In accordance with well-known practice, the mandrel is then connected at one end to a supply of fluid pressure, usually pressurized steam and radial orifices 22 in the mandrel permit the steam to flow outwardly against the interior of the tube 20. As an aid in the fabrication process a bullet nose guide 22' is generally inserted into the free end of the mandrel opposite the end to which fluid pressure may be applied. The guide thus facilitates the subsequent fabrication process, and during the curing operation can be removed so that the end of the mandrel can be capped and sealed.

The next step in the hose fabrication process is to place a number of wrapped reinforcements 23 around the elastomeric tube 20. During this process one may utilize either the separately wrapped spring reinforcements according to FIGURE 2 or a plurality of reinforcements wrapped in a single continuous length according to FIGURE 1. If the individually wrapped springs are placed on the tube by slipping the cylindrically shaped wrapped reinforcements 23 over the bullet-nosed guide 22', they are indexed upon the tube at a predetermined position by means of indexing guides 24 fixedly attached to the stationary supporting structure (not shown) of the mold, and the wrapped springs 23 are spaced therebetween. If a plurality of springs contained in a single wrap is used, these springs are similarly displaced from one another within the fabric wrapping, which is accomplished during the initial wrapping operation. The indexing guides 24 merely serve as a physical stop to establish the placing of the spring. Of course, there are many means for establishing placement of a component, all of which are well-known in the machine design art and may be of conventional commercial design. For simplicity's sake, the applicant prefers a simple physical stop such as the indexing guides 24.

In order to mold the hose structures in a single operation, it has been found expedient to place a number of molds 25 in end-to-end relation each mold having an internal cavity which describes a length of helical corrugation and a smooth cylindrical portion at each end. The reinforcing members, therefore, are indexed upon the mandrel so that each successive turn of the helical spring will be accommodated in each successive corrugation within the mold. As was noted, there was allowed an interval between succeeding helical reinforcing members at which no helical reinforcement was present, which intervals will coincide with the smooth cylindrical end portions of the mold. This procedure holds for both the individually wrapped reinforcing members. Moreover, if individually wrapped reinforcing members are utilized, it may be desired to supply an additional strip of fabric reinforcing 26 to that portion between the wrapped spring members in order that additional reinforcement may be given to the resulting cylindrical hose end structure.

In order to facilitate a diversification of mold sizes and in order to facilitate also both loading and unloading of the hose components and hose structures, it has been found convenient to split the molds in the axial direction into two upper and lower matching mold halves 35 and 36, as represented, and where corresponding halves are joined in end-to-end relation as previously described. It is seen that with the choosing of the molds to be joined in end-to-end relation, simultaneous production of various hose lengths may be accomplished.

As a primary feature of the present invention, for a given nominal internal diameter hose, very definite dimensional relationships are maintained between the various hose components and the mold. In the preferred embodiment, and for purposes of illustration only, with a nominal 2 in. I.D.–2.344 in. O.D. hose the dimensional relationships of the various components are chosen to give specific end results which will become more obvious as the embodiment is explained. As was previously stated, the wrapped reinforcing member 23 essentially assumes the form of a cylinder, and individual turns 27 thereof are indexed to coincide in pitch with the troughs 13 in the cavity of the mold, as best seen from FIGURE 5. The crests 28 of the mold portion therefore fit intermediately between the successive turns of the reinforcing member, since the effective diameter of the crests is less than that of the external wrap of the spring reinforcing member, since the effective diameter of the crests reinforcing member is closely controlled by the form 10 and preferably upon placement in the mold, the diameter is controlled so that a space 30 remains between crests 29 of the reinforcing member 23 and the troughs 13. This distance between the crests 29 and troughs 13 should approximate the distance necessary to place the turns 27 midway between the internal and external surfaces of the final hose body so as to be completely imbedded therein; and, would therefore be approximately 0.053 in. for a 2 in. I.D. and 2.344 O.D. hose, 2.344 in.

It can be seen from the above dimensions that when the mold halves are closed the crests of the mold will pinch down the area between the successive turns of the reinforcing member. This action will also help to dimensionally orient the wrapped reinforcing member within the mold. When heat under pressure is applied within the rubber tube, the tube will be caused to expand and flow outwardly to a hose body of uniform thickness throughout, as seen from FIGURE 6. In this relation, the material of the tube will flow in and around the wrapped reinforcement 23, completely filling the space 30 and imbedding the spring 12. For this reason, the fabric wrap 15 is preferably an open weave to the extent that the tube elastomer is capable of flowing preferably therethrough; however, at the crests 28 of the molded hose the fabric wrap 15 will remain at the outer surface of the hose in the area 31.

Heat and pressure are applied until the elastomeric portions of the components are completely vulcanized throughout such that all components are bonded into a complete unitary structure. What is obtained, of course, is a number of adjacent, end-to-end hose structures, all joined by common cylindrical ends. After vulcanization is complete, the mold halves are separated and the elongated structure may be removed from the hose and from the hollow mandrel. It is seen that by virtue of the ganging of the molds and of the unitized molding procedure, a number of individual hose members have been produced in a single molding operation. All that remains is for the individual hose members to be severed one from another at a point essentially at the mid point of the cylindrical end portion.

As was previously mentioned, once the spring has been formed and set in a predetermined pitch and diameter relationship the spring may be secured into this relationship by various means other than a rubberized fabric. In connection with this, it becomes obvious that once the spring is secured into the permanent dimensional relationship by the outer wrapping, this structure itself may be used as a modified defroster type hose and air duct tubing. Thus, for instance, if a spring that is secured by an outer wrap of rubberized fabric is then cured and vulcanized, this structure in itself will serve the purpose of a defroster type hose or air duct tubing. Furthermore, the spring forming and wrapping operation would be adapted for use in applications other than the specific molded hose forming operation described.

Having thus described the invention with particular reference to a preferred form and certain modifications, it is obvious that thorough understanding of the invention will enable those skilled in the art to adopt various changes and other modifications in conjunction therewith without departing from the spirit and scope of the invention as defined by the claims appended hereto.

What is claimed is:

1. The method of manufacturing a plurality of flexible corrugated reinforced hose sections and molding said sections in a mold having a pitch defined by a spiral trough in the mold comprising the steps of: forming a spiral reinforcement having spaced-apart adjacent convolutions; placing a number of said reinforcements upon a radially expandable form having inscribed therein a spiral guide of a pitch identical to the pitch defined by the spiral trough of the mold; indexing the convolutions of the spiral reinforcements with the guide of said expandable form; expanding the form to a diameter in accordance with the diameter of the hose sections and tightly holding said spiral reinforcements in fixed relation; wrapping a rubberized fabric at least one complete turn around the reinforcements to hold the reinforcements in a fixed position and to form a cylinder of rubberized fabric having disposed therein the spaced-apart reinforcements; separately forming a cylindrically shaped tube from elastomeric rubber and having a diameter less than the diameter of the cylinder of rubberized fabric having the reinforcements disposed therein; placing a length of said elastomeric cylindrically shaped tube around a hollow mandrel having orifices and to which hollow mandrel is attached a fluid pressure source; placing the cylinder of rubberized fabric containing said reinforcements over the elastomeric tube; enclosing the thus formed structure between a series of end-to-end disposed mold halves whose interior surface defines a helically corrugated cavity having intermittent smooth cylindrical portions which portions coincide with the spacings between the spacing of adjacently wrapped reinforcements; simultaneously applying heat and fluid pressure to the interior of the elastomeric tube forcing said elastomeric rubber to conform to the interior of said mold halves and completely imbedding said reinforcements within the elastomer; continuing said heating until said elastomeric components are completely vulcanized into a unitary structure; removing said structure from said mold and severing the structure intermediate the smooth cylindrical portions into a number of separate hose portions having helically corrugated body portions and smooth cylinder end portions.

2. The method of manufacturing a spirally reinforced hose and molding said hose in a mold having a pitch defined by a spiral trough in the mold and having a diameter defined by the diameter of crests in the mold and by the diameter of troughs in the mold comprising the steps of: placing a spiral reinforcing member having axially spaced turns over a radially expandable form having on the surface thereof a spiral guide of a pitch identical to the pitch defined by the spiral trough of the mold; diametrically expanding said form to a diameter greater than the diameter defined by the crests of the mold but less than the diameter defined by the trough of the mold and aligning said reinforcing member with the axially spaced turns of the reinforcing member corresponding with the helical guide on the form; securing to the surface of said spiral reinforcing member a retention member thereby holding the spaced turns of the spiral reinforcing member in a fixed pitch and diametric relationship; separately forming a cylindrically shaped tube from elastomeric rubber and having a diameter less than the diameter of a cylinder described by the inner surface of the secured spiral reinforcing member; placing a length of said elastomeric tube around a hollow mandrel having orifices and to which hollow mandrel portion is attached a fluid pressure source; placing the secured spiral reinforcement over the elastomeric tube; enclosing the elastomeric tube with the secured spiral reinforcing member thereover between corrugated mold halves having smooth cylindrical end portions with the turns of the spiral reinforcing member in alignment with the troughs of the mold, the crests of which mold halves are of a diameter less than the diameter of the spiral reinforcing member but greater than the diameter of the elastomeric tube and the troughs of which are of a diameter greater than the diameter of the secured reinforcing member; simultaneously applying heat and fluid pressure to the interior of the elastomeric tube thereby forcing said elastomeric tube to conform to the mold interior and completely embedding said spiral reinforcement within the elastomeric tube and continuing said heating until component parts are completely vulcanized into a unitary hose structure.

3. A method for the manufacture of a plurality of cylindrical molded hose of elastomeric material having helical corrugations intermediate its ends, said corrugations being internally reinforced by a spirally convoluted metal spring member disposed within the crests of said corrugation below the surface of said crests, said hose being formed by molding said hose in a mold having a pitch defined by a spiral trough in the mold which comprises the steps of: forming a spirally convoluted metal spring member; placing said spring member upon a radially expandable form having on the surface thereof a spiral guide of a pitch substantially equal to the pitch defined by the spiral trough of the mold; expanding said form and tightly registering said spring member by means of the fixed pitch spiral guide; wrapping a fabric reinforcement member at least one complete wrap around said spirally convoluted metal spring member and holding said spring member in a fixed pitch relation; separately forming a tubular body member of elastomeric material; placing the body member over a hollow mandrel having axially spaced orifices extending radially from the interior of said mandrel to the external surface thereof, said mandrel connected at one end to a source of fluid pressure; placing over said tubular body member at spaced-apart intervals a plurality of said convoluted metal spring members with the wrapped fabric reinforcement thereover; externally encompassing the elastomeric tubular body member with the convoluted metal spring members thereover in tubular molds placed in an end-to-end relation, said molds having internal helical corrugations in alignment with the turns of said spirally convoluted metal spring member and having circular smooth end portions corresponding with the spaced-apart intervals between the spring members; simultaneously applying heat and fluid pressure internally to said elastomeric tubular body member thereby causing the elastomeric tubular body member to expand to conform to the configuration defined by the interior of said molds and embedding the spring within the elastomeric portion of said tubular body member; continuing said heating and pressure for a sufficient time to cure said elastomeric material into a unitary hose structure; removing said hose structure from said molds and severing the structure into separate hose members at substantially the middle portion of the circular smooth section of the hose.

4. A method according to claim 2 wherein the retention member holding the turns of the spiral reinforcing member is a rubberized fabric wrapped around the circumference of said spiral reinforcing member at least one full turn.

5. A method according to claim 2 wherein the spiral reinforcing member is a metal spring.

6. A method according to claim 2 in which reinforcing sheet material is placed around the smooth cylindrical end portions before the component parts are vulcanized to form a unitary structure.

7. A method according to claim 3 wherein the intervals between the spaced-apart spring members are reinforced by a sheet material prior to vulcanization.

References Cited by the Examiner

UNITED STATES PATENTS

| | | | |
|---|---|---|---|
| 2,780,273 | 2/1957 | Roberts | 156—144 |
| 2,858,854 | 11/1958 | Daggett | 156—144 X |
| 2,936,812 | 5/1960 | Roberts | 156—144 X |
| 3,028,291 | 4/1962 | Roberts et al. | 156—143 |

EARL M. BERGERT, *Primary Examiner.*

P. DIER, *Assistant Examiner.*